US012213922B2

(12) United States Patent
Te Pas et al.

(10) Patent No.: US 12,213,922 B2
(45) Date of Patent: Feb. 4, 2025

(54) NEWBORN SUPPORT DEVICE AND RESUSCITATION DEVICE

(71) Applicant: ACADEMISCH ZIEKENHUIS LEIDEN H.O.D.N. LUMC, Leiden (NL)

(72) Inventors: Arjan Benedictus Te Pas, Leiden (NL); Erwin Knoester, Leiden (NL); Franciscus Josephus Christiaan Marie Klumper, Leiden (NL); Alexius Stefanus Nicolaas Vernooij, Leiden (NL)

(73) Assignee: ACADEMISCH ZIEKENHUIS LEIDEN H.O.D.N. LUMC, Leiden (NL)

(*) Notice: Subject to any disclaimer, the term of this patent is extended or adjusted under 35 U.S.C. 154(b) by 1151 days.

(21) Appl. No.: 16/065,370

(22) PCT Filed: Dec. 30, 2016

(86) PCT No.: PCT/NL2016/050928
§ 371 (c)(1),
(2) Date: Jun. 22, 2018

(87) PCT Pub. No.: WO2017/116233
PCT Pub. Date: Jul. 6, 2017

(65) Prior Publication Data

US 2021/0220200 A1 Jul. 22, 2021

(30) Foreign Application Priority Data

Dec. 31, 2015 (EP) .................................... 15203251

(51) Int. Cl.
*A61G 11/00* (2006.01)

(52) U.S. Cl.
CPC ........ *A61G 11/00* (2013.01); *A61G 2200/327* (2013.01); *A61G 2210/00* (2013.01)

(58) Field of Classification Search
CPC ................ A61G 11/00; A61G 2210/00; A61G 2200/327
See application file for complete search history.

(56) References Cited

U.S. PATENT DOCUMENTS 395,001 A * 12/1888 Russell .................. A61G 7/015 5/619
3,094,986 A * 6/1963 Lally ........................ A61G 1/00 602/40

(Continued)

FOREIGN PATENT DOCUMENTS

JP 2014033769 A 2/2014
RU 2376969 C1 12/2009

(Continued)

OTHER PUBLICATIONS

GE Healthcare. The Giraffe Family. Laurel, MD: GE Healthcare, 2010. (Year: 2010).*

(Continued)

*Primary Examiner* — Christine H Matthews
*Assistant Examiner* — Marc D. Honrath
(74) *Attorney, Agent, or Firm* — LUCAS & MERCANTI, LLP

(57) ABSTRACT

A newborn support device for supporting a newborn in close proximity to the mother is provided. The newborn support device has a support platform for receiving thereon the newborn in an almost fully supported manner. The platform is provided with an elongated slit which is accessible from a side of the platform and extends through the platform from the top surface to a bottom surface of the platform. The slit enables resuscitation of the newborn on the platform with delayed cord clamping. In another aspect the invention (Continued)

relates to a resuscitation device having resuscitation means connected to such a support device.

15 Claims, 11 Drawing Sheets

(56) References Cited

U.S. PATENT DOCUMENTS

| | | | | |
|---|---|---|---|---|
| 5,218,958 | A | 6/1993 | Cooper | |
| 5,387,177 | A | 2/1995 | Dunn | |
| 7,966,678 | B2 | 6/2011 | Ten Eyck et al. | |
| 9,226,596 | B2 * | 1/2016 | Beevers | A61G 11/008 |
| 10,543,140 | B2 * | 1/2020 | Kunysz | A61G 1/0212 |
| 2009/0178202 | A1 * | 7/2009 | Kovalyak | A47D 15/008 5/655 |
| 2011/0130620 | A1 * | 6/2011 | Dmello | A61G 11/002 600/22 |
| 2012/0269568 | A1 * | 10/2012 | Matsubara | A61G 11/006 403/104 |
| 2013/0145547 | A1 | 6/2013 | Su | |
| 2013/0283536 | A1 | 10/2013 | Beevers et al. | |
| 2015/0182406 | A1 * | 7/2015 | Falk | G05D 23/1934 600/22 |
| 2016/0213540 | A1 | 7/2016 | Kunysz | |

FOREIGN PATENT DOCUMENTS

| | | | |
|---|---|---|---|
| WO | 2010033429 | A1 | 3/2010 |
| WO | WO-2017053406 | A1 * | 3/2017 |

OTHER PUBLICATIONS

Atom Medical Corporation. Sunflower Warmer. Tokyo, Japan: Atom Medical International, Inc. , 2012. (Year: 2012).*

Weeks, A D et al. "Innovation in immediate neonatal care: development of the Bedside Assessment, Stabilisation and Initial Cardiorespiratory Support (BASICS) trolley." BMJ innovations vol. 1,2 (2015): 53-58. doi:10.1136/bmjinnov-2014-000017 (Year: 2015).*

Natus Medical Incorporated. (2012). Natus Newborn Care Catalog. San Carlos, CA; Global Sales & Support. (Year: 2012).*

Weeks, A. D., Watt, P., Yoxall, C. W (2015). Innovation in immediate neonatal care: Development of the Bedside Assessment, Stabilisation and Initial Cardiorespiratory Support (BASICS) trolley. BMJ Innovations, 1(2), 53-58. https://10.1136/bmjinnov-2014-000017 (Year: 2015).*

Weeks et al., "Innovation in immediate neonatal care: development of the Bedside Assessment, Stabilisation and Initial Cardiorespiratory Support (BASICS) trolley", BMJ Innov, 2015, vol. 1, pp. 53-58.

International Search Report for Corresponding International Application No. PCT/NL2016/050928 (Mar. 20, 2017) (11 Pages).

Margaret R. Thomas, et al., "Providing Newborn Resuscitation At the Mother's Bedside: Assessing the Safety, Usability and Acceptability of a Mobile Trolley", BMC Pediatrics, vol. 14, No. 135, pp. 1-6, 2014.

David Hutchon, "Evolution of Neonatal Resuscitation With Intact Placental Circulation", Clinical Practice, vol. 10, No. 2, pp. 58-61, 2014.

Balkawade Nilesh Unmesh, et al., "Study of Length of Umbilical Cord and Fetal Outcome: a Study Of 1,000 Deliveries", The Journal of Obstetrics Gynecology of India, vol. 62, No. 5, pp. 520-525, 2012.

Sasmira Bhatt et al.; "Delaying Cord Clamping Until Ventilation Onset Improves Cardiovascular Function At Birth in Preterm Lambs", Journal of Physiology, vol. 591.8, pp. 2113-2126, 2013.

Robert Goldenberg et al., Preterm birth 1 "Epidemiology and Causes of Preterm Birth", Lancet, vol. 371, pp. 75-84, 2008.

* cited by examiner

NEWBORN SUPPORT DEVICE AND RESUSCITATION DEVICE

CROSS-REFERENCE TO RELATED APPLICATIONS

This application is a 371 of PCT/NL2016/050928, filed Dec. 30, 2016, which claims the benefit of European Patent Application No. 15203251.2, filed Dec. 31, 2015.

FIELD OF THE INVENTION

The present invention relates to a newborn support device for supporting a newborn, particularly a preterm newborn, in close proximity to the mother comprising a support platform having a top surface for receiving in an at least almost fully supported manner the newborn thereon. The invention moreover relates to a resuscitation device for resuscitating a newborn, particularly a preterm newborn, the resuscitation device comprising resuscitation means connected to a support device for supporting the newborn.

BACKGROUND OF THE INVENTION

Although most newborns undergo the transition from the protective liquid-filled in utero environment to the gaseous ex utero environment without too much difficulty, some newborns, mainly preterm newborns (~10% of all births), have difficulties in the transition and require some form of respiratory support or even resuscitation. Timely and successful respiratory support to the newborn is of utmost importance to prevent the serious and severe short and long term consequences of birth asphyxia and preterm birth.

In many cases at childbirth an asphyxic newborn is immediately separated from the placenta by clamping and cutting the umbilical cord and then transferred to a resuscitation table, usually far away from the mother, for providing the necessary resuscitation. In recent years studies on the physiological transition at birth have shown that establishing ventilation in the newborn before the umbilical cord is clamped greatly stabilizes the cardiovascular transition at birth. Delayed cord clamping, as compared to immediate clamping, reduces the risk of intracranial hemorrhages, necrotizing enterocolitis, hypotension and need for blood transfusions. While this is mainly attributed to increased newborn blood volume, it has now been demonstrated that immediate cord clamping reduces preload and cardiac output due to a loss of umbilical venous return. These large swings in hemodynamic function increase the risk of I/PVH and associated rates of mortality and morbidity. Deferring cord clamping until after ventilation and aeration of the lungs sustains preload and cardiac output and avoids the large disturbances in systemic and cerebral hemodynamics during transition.

Newborn support devices that allow resuscitation of the newborn while the cord remains intact are thus developed. These newborn support devices comprise a support platform or table that can be positioned in close proximity to the mother, e.g. above or near the bed whereon the mother is resting. The support platform provides a suitable and reliable surface on which the newborn may be carried in fully supported manner allowing for resuscitation and other possibly necessary supportive treatments of the newborn.

However, there are certain limitations to these support devices that hinders or even renders it impossible to perform standard care with delayed cord clamping. A drawback of these newborn support devices is that only in the event that the umbilical cord proves to be sufficiently long the newborn may be placed on the platform to allow resuscitation with delayed cord clamping. However, the umbilical cord of a preterm infant is in most cases much shorter as compared to term infants. In such cases the length of the umbilical cord may prove to be too short so that the newborn cannot be properly supported on the platform without stretching or otherwise adversely affecting the umbilical cord. In such cases it is still often decided or even necessitated to immediately clamp and cut the umbilical cord, despite the clear benefits of delayed cord clamping.

SUMMARY OF THE INVENTION

As particularly preterm newborns due to their underdeveloped physiological state greatly benefit from delayed cord clamping, it is an aim of the present invention, amongst others, to provide a newborn support device that overcomes the drawback of the known newborn support devices in that full care can be provided to newborns while the cord is intact.

In order to achieve this aim a newborn support device of the type described in the first paragraph is according to the present invention characterized in that the support platform is provided with an elongated slit that defines a passage in the support platform which is accessible from a side of the platform and extends through the platform from the top surface to a bottom surface of the platform to enable passing of an umbilical cord with which the newborn is attached to the mother through at least a part of the platform. The present invention is based on the recognition that the support should enable positioning of the newborn with intact umbilical cord as close as possible above the vaginal introitus (birth canal) of the mother with the umbilical cord following a shortest possible path between the placenta and the newborn. The elongated slit which is accessible from the side of the platform enables moving of the umbilical cord from an outside or peripheral position with respect to the platform to a more central position with respect to the platform. Compared to the known support devices where the support platform necessitates the umbilical cord to extend or stretch around a distant peripheral edge of the platform, the slit defined in the platform according to the present invention thus shortens the path for the umbilical cord to follow between the vaginal introitus and the newborn. Accordingly even in cases of a relatively short length umbilical cord, such as in many instances with preterm newborns, the platform of the support device according to the invention allows to support and resuscitate the newborn with delayed cord clamping.

Preferably the elongated slit extends from an access opening through the platform to a central region with respect to the top surface which allows the umbilical cord to extend in an at least almost straight vertical direction between the vaginal introitus and the newborn when the platform is positioned with the slit above the vaginal introitus. The support platform allows the newborn to be stabilized and kept as close as possible near the mother while respiratory support is delivered without needing to stretch the umbilical cord in any way. This renders it possible to defer cord clamping until it is most beneficial for the newborn, e.g. after some respiratory support has been given.

Preferably the support platform of the newborn support device according to the invention is movable with respect to the newborn mother's bed, and in particular the newborn support device allows for a positioning of the support platform at least partly extending over the bed surface, and most preferably with the slit in the platform positioned at least almost vertically above the vaginal introitus of the mother. Such positioning of the support platform in addition to providing support to the newborn with delayed cord clamping, moreover realizes family centered care, with the newborn being positioned in close proximity to the mother to allow beneficial physical contact between the mother and her child. Such physical contact has the potential to stimulate the newborns breathing effort.

The dimensions of the slit should be such that movement of the umbilical cord through the slit is possible. A width of the slit is preferably minimally the largest diameter of a cross section of the umbilical cord. For a term newborn the average diameter of the umbilical cord is approximately 2 cm. Thus the slit preferably has a width of approximately 2 cm. In a particular embodiment the newborn support device according to the invention is characterized in that the slit narrows from the access opening to a part of the slit in the central region of the top surface. The narrowing of the slit allows for a sufficient width of the slit at the access opening for convenient guidance of the umbilical cord in the slit, while a width of the part of the slit in the central region of the top surface on which the newborn may be placed is kept to a minimum. A larger than necessary slit dimension in the central region of the top surface on which the newborn may be placed increases the risk that a body part of the newborn is not sufficiently or adequately supported by the platform. Thus the dimensions of the slit in the more central region of the top surface is preferably as small as possible while allowing movement of the umbilical cord through approximately a full length of the slit.

A preferred embodiment of the newborn support device according to the invention is characterized in that the platform comprises a plate-like member in which the slit is provided. The plate-like member provides for a relatively thin support platform that may be conveniently positioned above the mother's bed as close as possible to the vaginal introitus of the mother. The slit may be formed in the plate-like member, which may be made of or formed out of any sufficiently strong material, by a convenient material removing step, such as a cutting or etching step, or by shape forming the plate-like member, for example by using a molding technique.

A further preferred embodiment of the newborn support device according to the invention is characterized in that the platform is an elongated platform with the slit extending in a longitudinal direction of the platform. The elongated platform is more preferably dimensioned such that most or all newborns independent of their body size at birth may be carried by the platform in a fully supported manner. Thus, the platform is preferably dimensioned with a sufficiently large top surface to receive any newborn thereon. Preferably the slit extends in the longitudinal direction from a mid point of a short side of the elongated platform. More preferably the slit extends from the mid point of the short side along a central longitudinal axis of the elongated platform. When a newborn is supported on the platform the slit may accordingly extend in the platform top surface between the left and right leg of the newborn.

Preferably a length of the slit between the access opening and an end of the slit in the central region of the top surface is such that the slit spans a distance between an outer edge of the platform defining the access opening and a point in the top surface adjacent a part of the top surface on which the newborns body is positioned. A particular embodiment of the newborn support device according to the invention is characterized in that the slit extends from the side of the platform along at least one quarter of a length of a longitudinal axis of the platform, and preferably over at least one third of a longitudinal axis of the platform. The slit may extend over a full length of the elongated platform, thus dividing the platform in two parts on either side of the slit. In such an embodiment the two parts of the platform may for instance be coupled to each other by suitable coupling means.

As the platform in use will be positioned at a height, e.g. above the mother's bed surface, means should be provided to prevent the newborn from falling of the platform. Accordingly in a further preferred embodiment the newborn support device according to the invention is characterized in that the support platform comprises at least an edge part extending upward from the top surface at an outer circumference. The at least edge part extending upward from the top surface on which the newborn is placed forms a physical barrier which prevents the newborn from falling of the platform. The at least edge part may encompass a continuous, uninterrupted, peripheral edge extending upward from the top surface. Preferably two or more edge parts extend upward from the top surface of the platform with openings or spaces being provided in between the edge parts which allow lateral access to the newborn on the top surface, for instance in order to allow easy manual lifting of the newborn from the platform after all needed care has been provided.

A further preferred embodiment of the newborn support device according to the invention is characterized in that the support platform is coupled to a support frame which enables positioning of the platform in close proximity to the mother and in particular enables positioning of the platform aligned above the vaginal introitus of the mother. The support frame may for instance comprise a horizontal arm to which the platform is coupled for positioning above the mother's bed. The support frame may be rested on a wall, floor or ceiling of the surroundings. Particularly the frame allows for positioning and repositioning of the support platform as desired with respect to a mother's bed. In a particular embodiment the newborn support device according to the invention is characterized in that the support platform is coupled to the support frame with a pivot that enables pivoting of the platform with respect to the support frame in at least a horizontal plane. The support platform may for instance be rotated with respect to the frame from a first position with a longitudinal axis of the platform extending in a direction transversely to a longitudinal axis of an arm of the frame to which the platform is coupled to a second position with a longitudinal axis of the platform extending in a direction in line with the longitudinal axis of the arm of the frame to which the platform is coupled.

It will be understood that as long as the support platform of the newborn support device according to the invention can be positioned in close proximity to the mother resting on a bed or other suitable resting means, it will be possible to provide full care to the newborn while the cord is intact. Thus the newborn support device may according to the invention be formed as an assembly comprising the platform and a bed. In such assembly the platform may be integrally coupled with the bed or may be a separate element that can be provided simultaneously with other parts of the assembly, such as the bed, in order to provide a complete set-up ready for use for delivery of a newborn with the support platform being in close proximity to the mother.

The newborn support device may additionally or also be part of a resuscitation device that is fully equipped in order to provide standard care (monitoring, ventilation device, heater, humidifier and suctioning) to the newborn. Accordingly another aspect of the invention relates to a resuscitation device for resuscitating a newborn, particularly a preterm newborn, that comprises resuscitation means connected to a support device according to the invention.

As provision of adequate ventilation is essential at birth, but also an important part of the "ventilation before cord clamping" approach, in a preferred embodiment the resuscitation device according to the invention is characterized in that the resuscitation means comprise a resuscitation monitor for monitoring respiratory functions in the newborn. With such a resuscitation device adequate respiratory support can be provided to the newborn as it is fully monitored by a built-in resuscitation monitor displaying to the neonatal caregiver (neonatologist/pediatrician, registrar, nurse or other person) involved in providing care to the newborn relevant resuscitation data such as respiratory function, mask technique feedback, oxygen saturation, heart rate, oxygen given and video.

In a particular embodiment the resuscitation device according to the invention is characterized in that the resuscitation monitor is coupled to the support device adjacent the support platform. Thus, the neonatologist/pediatrician, registrar, nurse or other relevant person while giving support to the newborn, may view or observe the data displayed on the monitor without needing to move away from the support platform. Preferably the monitor is positioned such with respect to the support platform that the monitor is in a line of sight of the person giving support to the newborn.

As there is minimal physical contact between the newborn placed on the support platform and the mother, there is a particular need to provide means that may keep the newborn sufficiently warm. Thus a further preferred embodiment of the resuscitation device according to the invention is characterized in that the device further comprises warming means for directing heat to the support platform. In a particular embodiment hereof the resuscitation device according to the invention is characterized in that the warming means comprise a heat source positioned at a height above the support platform for providing radiation heat to a newborn supported on the support platform.

In a further preferred embodiment the resuscitation device according to the invention is characterized in that the device further comprises an undercarriage with rolling means. As such the resuscitation device may be movably supported on a ground surface to ease a positioning and repositioning of the resuscitation device with respect to the mother's bed as desired.

These and other aspects of the present invention are further elucidated by the appended drawings and the corresponding embodiments described hereinafter, which form part of the present application. The drawings and embodiments are not in any way meant to reflect a limitation of the scope of the invention, unless this is clearly and explicitly indicated.

DETAILED DESCRIPTION OF THE INVENTION

Figure 1A:
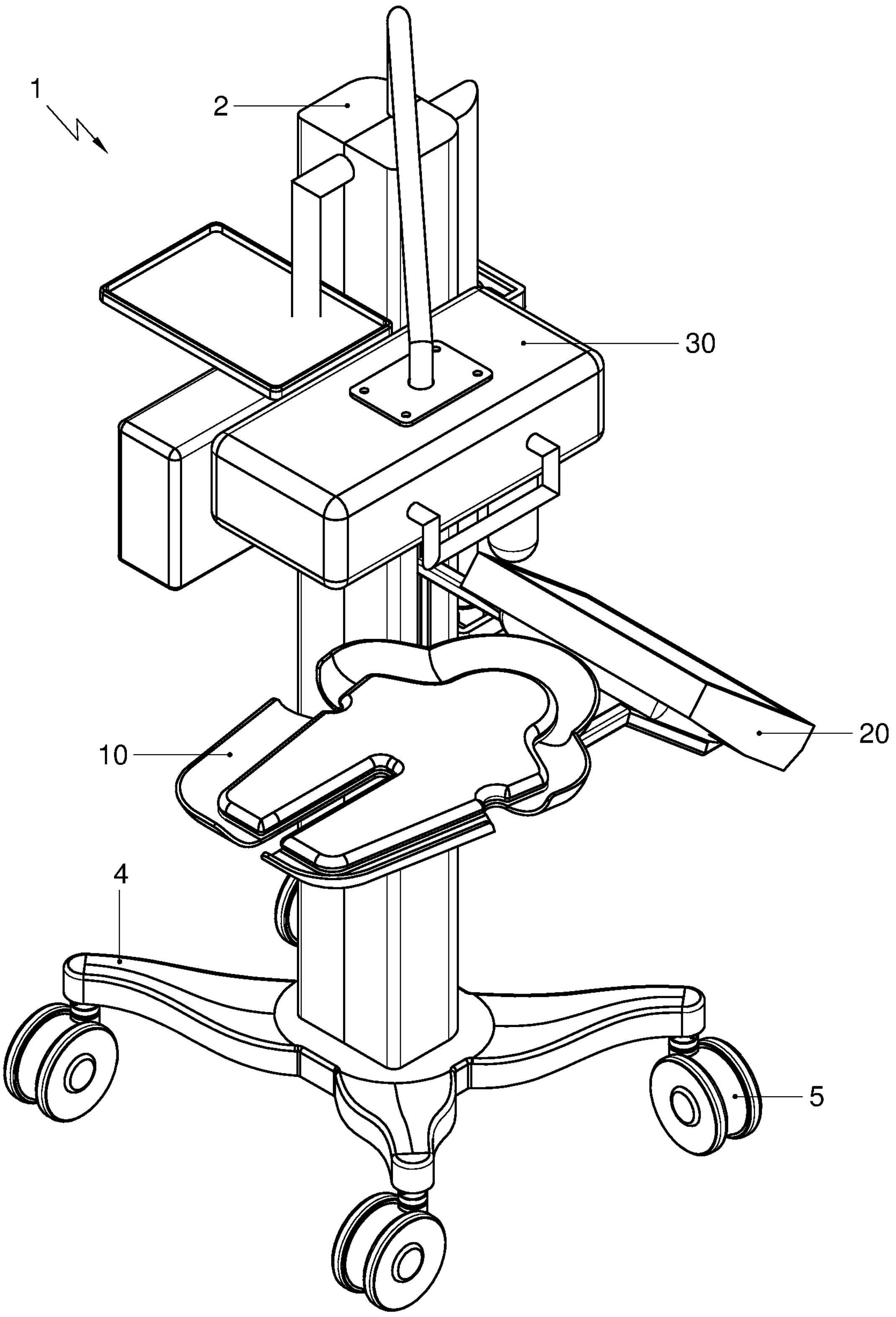
FIG. 1A-1B illustrates respectively a front-side and rear-side view of an embodiment of a resuscitation device according to the present invention.
Figure 1B:
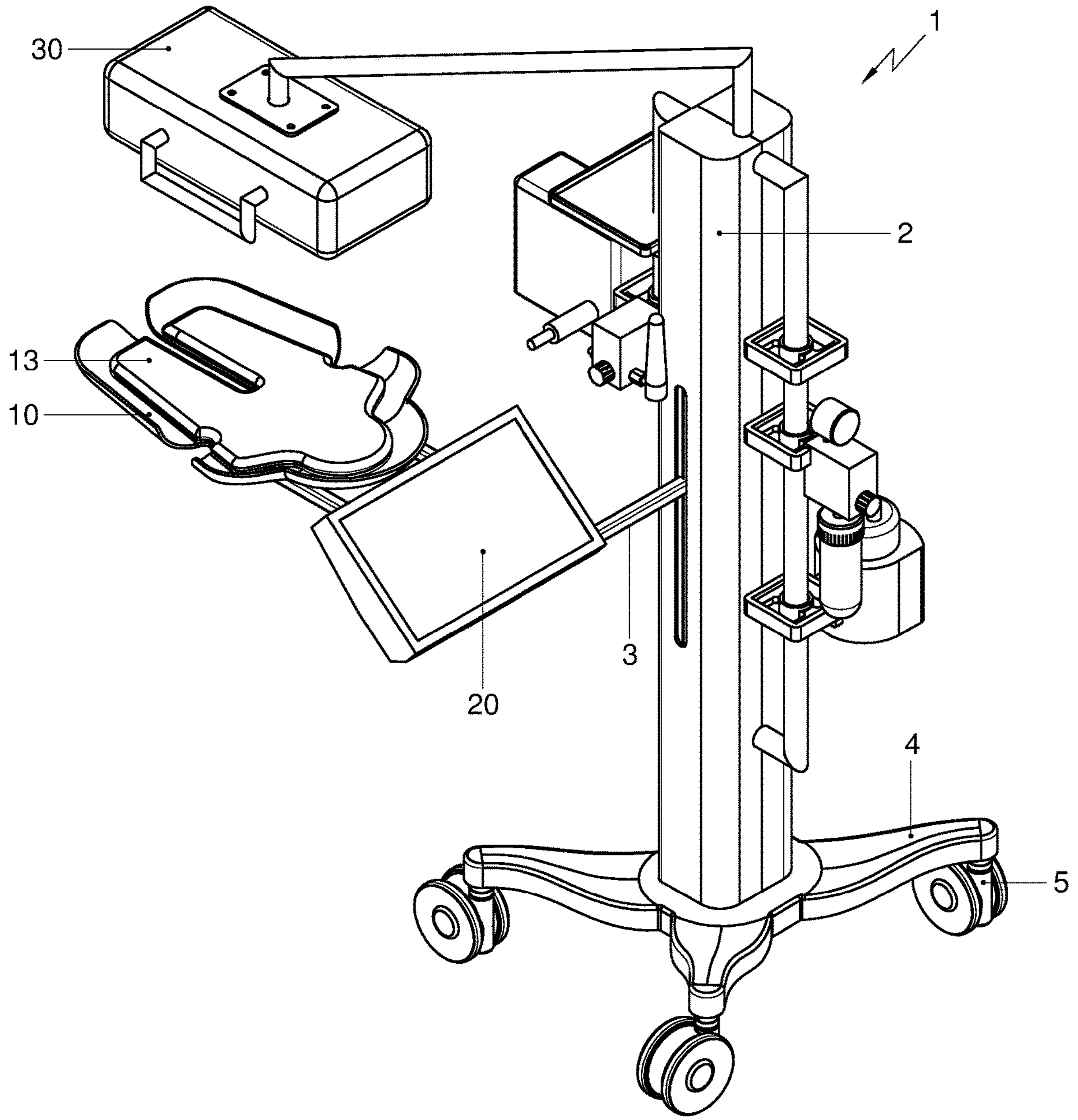
Figure 2A:
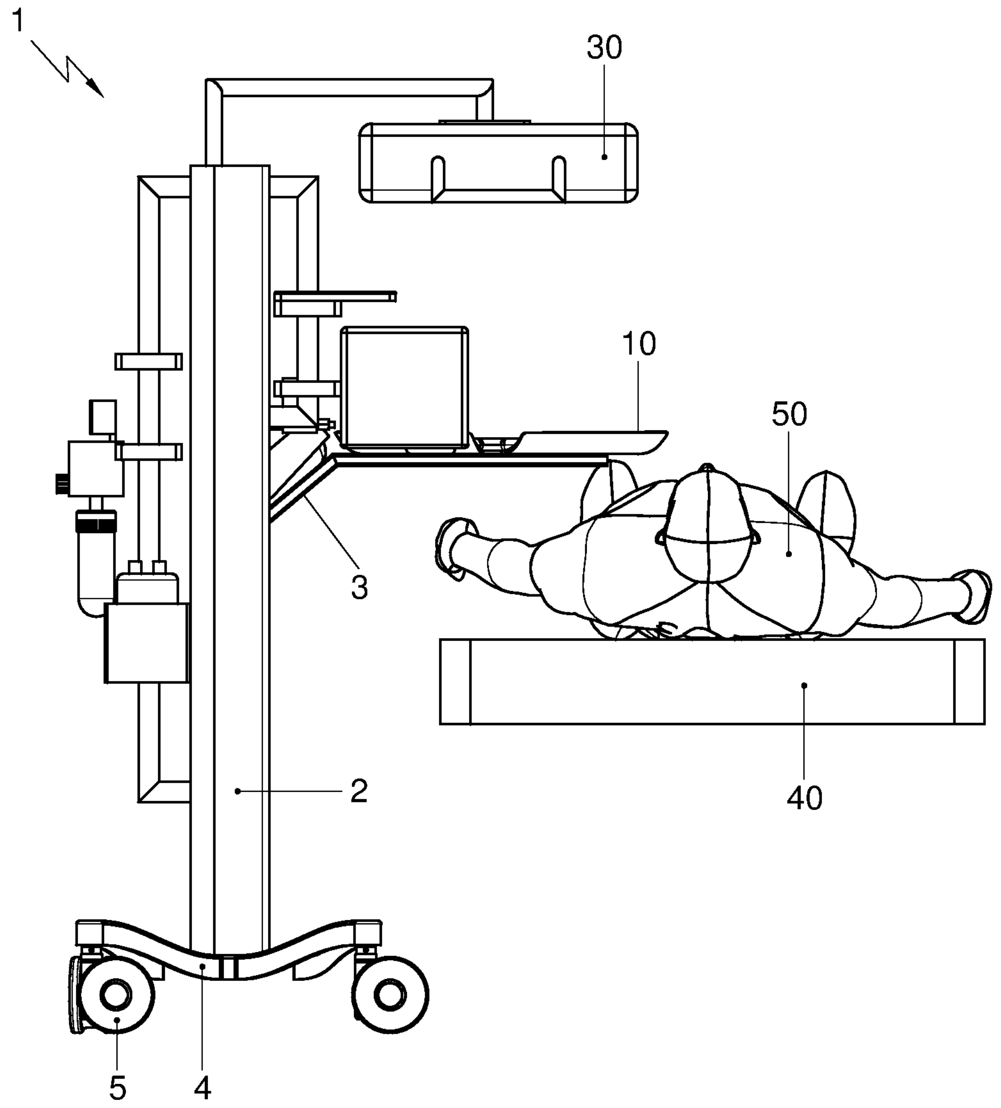
FIG. 2A-2B illustrates respectively a side and rear-side view of the embodiment of the resuscitation device shown in FIG. 1 as positioned with respect to a person laying on a bed.
Figure 2B:
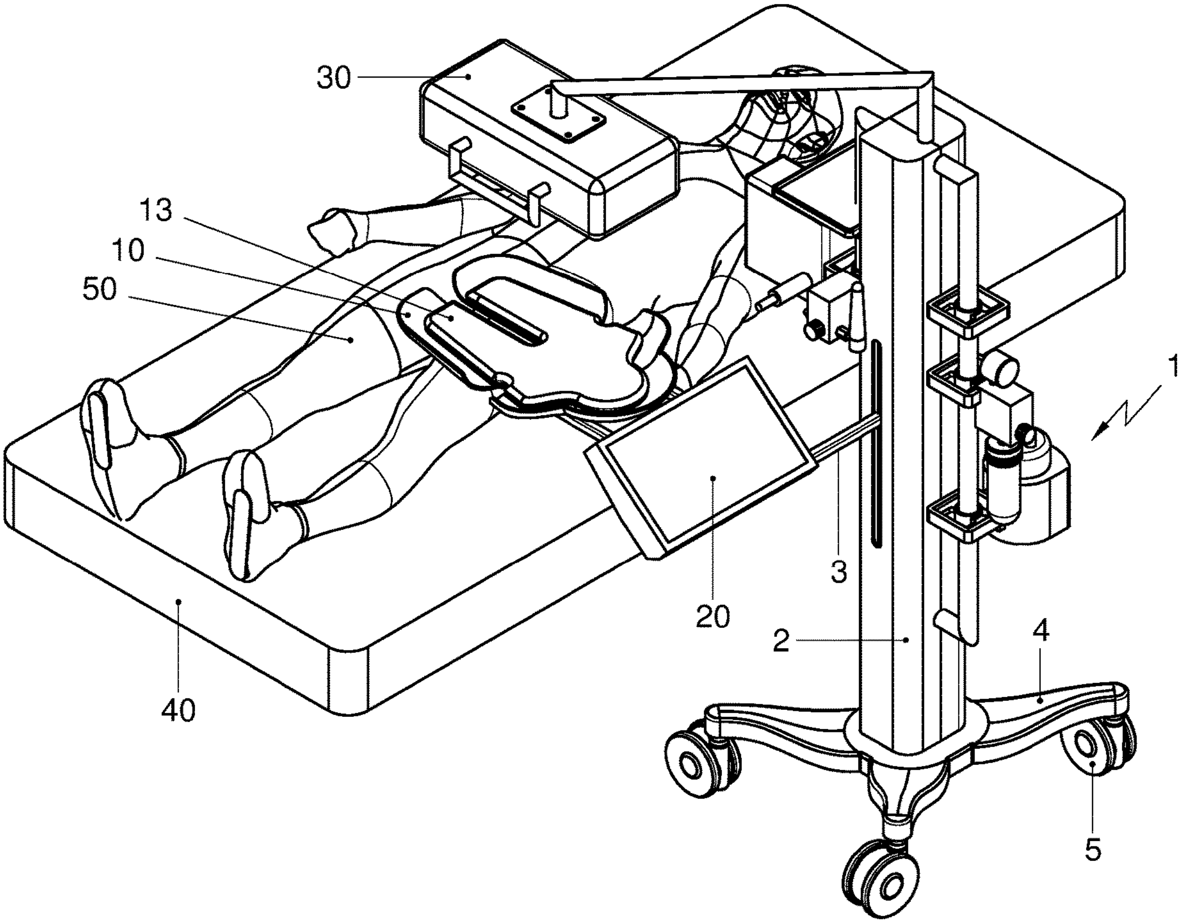

As is shown in FIGS. 1A, 1B, 2A and 2B the resuscitation device according to the invention comprises a movable cart 1 with a vertical stand 2 provided at a bottom with rolling means 5 for movement over a floor or ground surface. As such the resuscitation device may in use be easily placed near or besides a bed. The rolling means 5 to this end comprise a rolling body, for example a wheel, which may freely rotate, i.e. rotate 360 degrees, around a central shaft with which each rolling body is coupled to a respective toe 4 extending laterally from the vertical stand 2. A first arm extends laterally from the stand 2 near a top thereof and carries a warming means 30 in the form of a heat source which is capable of directing radiation heat to a surface there below. The heat source may for instance comprise a light source which is capable of radiating infrared light. Below the warming means 30 a newborn support device 10 of the resuscitation device is provided, which is coupled to the vertical stand 2 by means of a second arm extending laterally from the stand. The newborn support device 10 is capable of carrying a newborn in an at least almost fully supported manner. Coupling means may be provided between the newborn support device 10 and the second arm to allow the newborn support device 10 to move with respect to the arm, for instance be rotated in a horizontal plane perpendicular to the vertical stand. The coupling means to this end for example may comprise a pivot or hinge. Additionally the second arm may be coupled to the vertical stand in such a way as to allow movement of the arm with respect to the stand, for example moving in a height direction along at least a part of the height of the vertical stand. The movement of the newborn support device 10 with respect to the second arm and the movement of the second arm with respect to the stand allow for a positioning of the newborn support device 10 as desired with respect to a person 50, e.g. the mother of the newborn, laying on a resting surface 40, e.g. a bed, besides the resuscitation device (FIGS. 2A-2B) and/or with respect to the warming means 30.

Alternatively, or additionally, the warming means 30 may be movable with respect to the first arm and/or the first arm may be movable with respect to the stand 2 in order to allow a desired positioning and distance of the heat source 30 with respect to a newborn support device 10 of the resuscitation device. The movement may be realized by the provision of rotation means such as a pivot or a hinge between the stand 2 and the first arm and/or between the first arm and the warming means 30. As the newborn support device 10 and the warming means 30 may be positioned with respect to each other as desired an amount of heat provided by the warming means to the newborn support device can be regulated in order to maintain a body temperature of a newborn received on the newborn support device.

Adjacent the newborn support device 10 a resuscitation monitor 20 capable of monitoring respiratory functions of a newborn carried by the newborn support device 10 is coupled to the second arm. The monitor 20 is positioned such as to be in a line of sight of the neonatal caregiver giving care to the newborn, so that the caregiver may view or observe the data displayed on the monitor without needing to move away from the support platform and the newborn. This allows and safeguards a correct and continuous provision of respiratory support to the newborn, which may be of critical importance for preterm newborns.

Figure 3B:
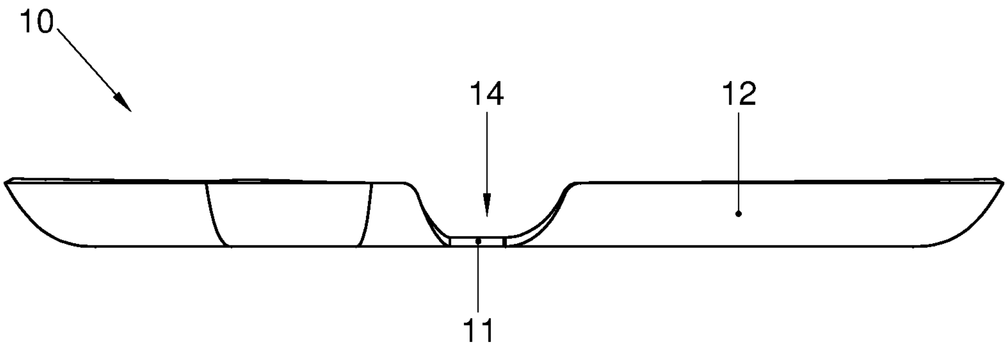
FIG. 3A-3B illustrates an embodiment of a newborn support device according to the present invention in respectively a top view and a side view.
Figure 3A:
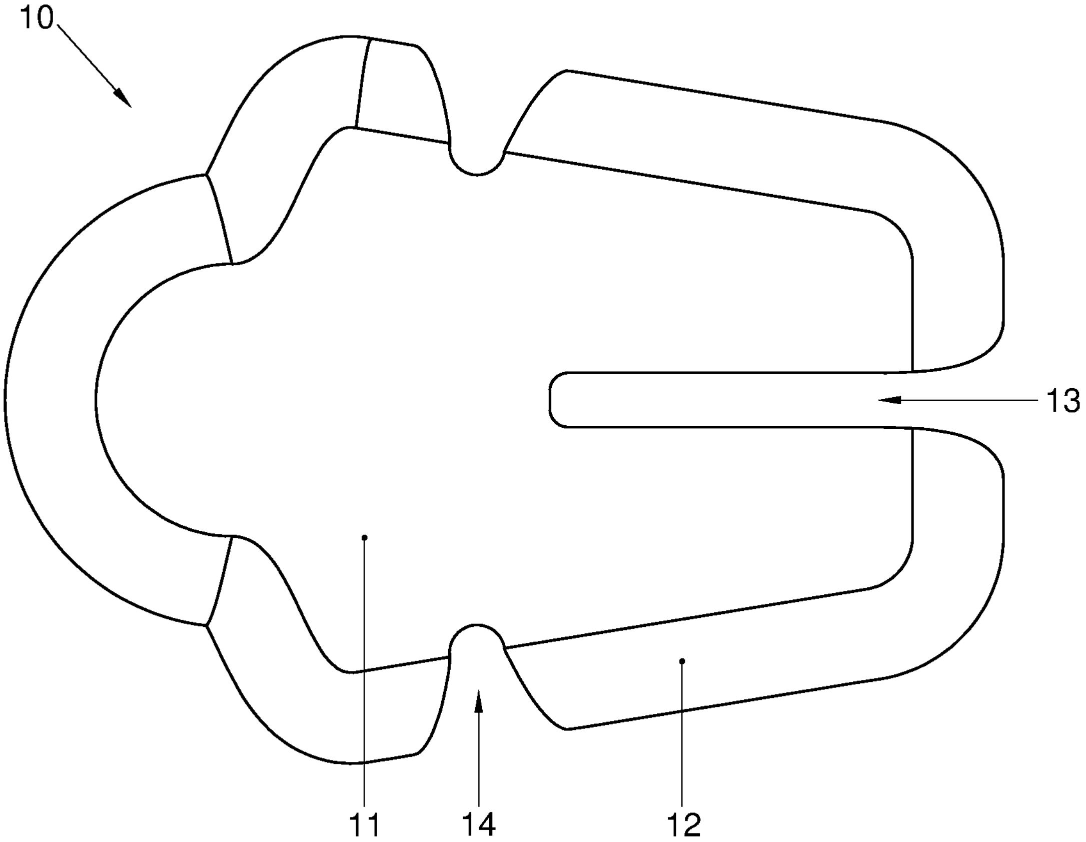
Figure 4A:
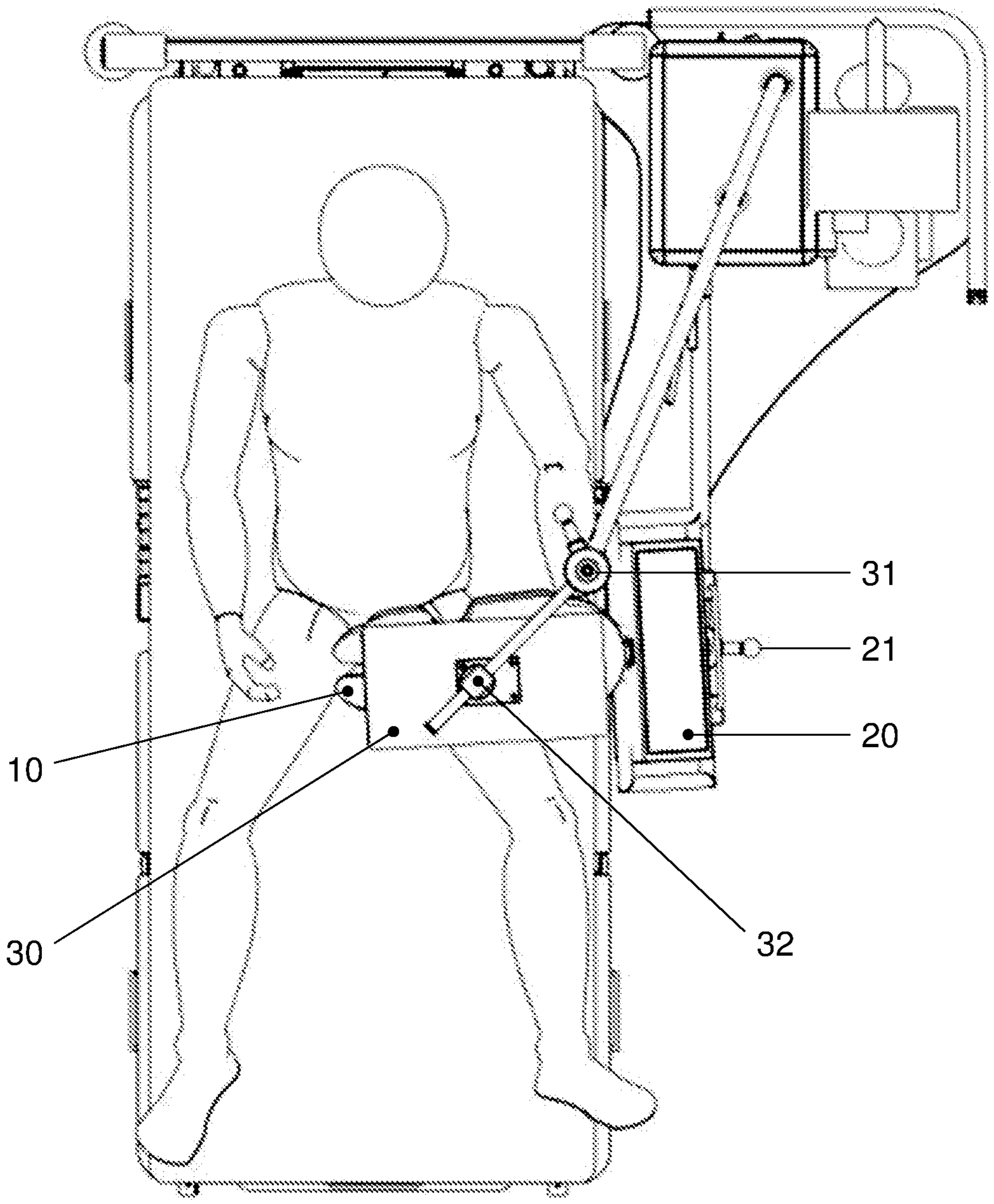
FIG. 4A-4F illustrates another embodiment of a resuscitation device according to the invention in use next to a bed in respectively a top view, side view, rear view, front view, rear-side view and front-side view.
Figure 4B:
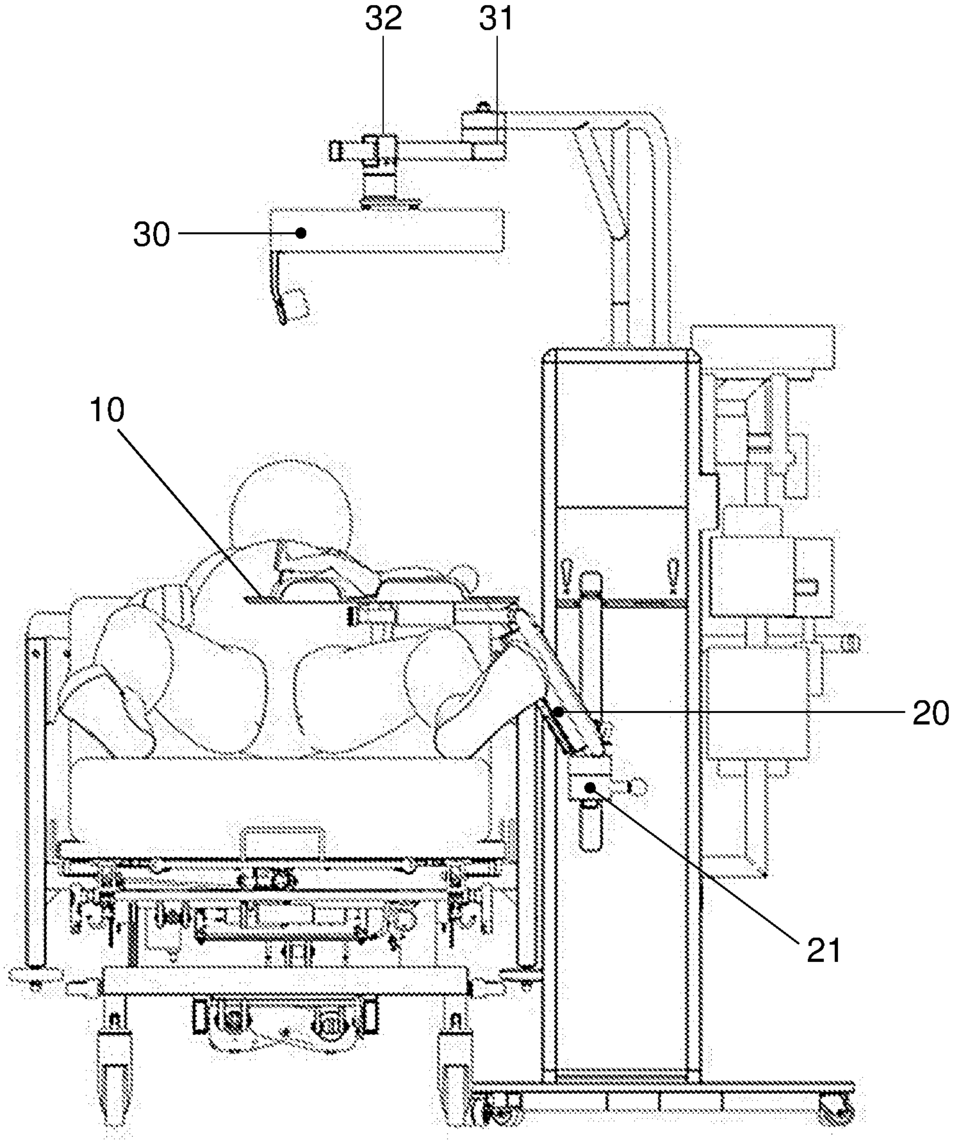
Figure 4C:
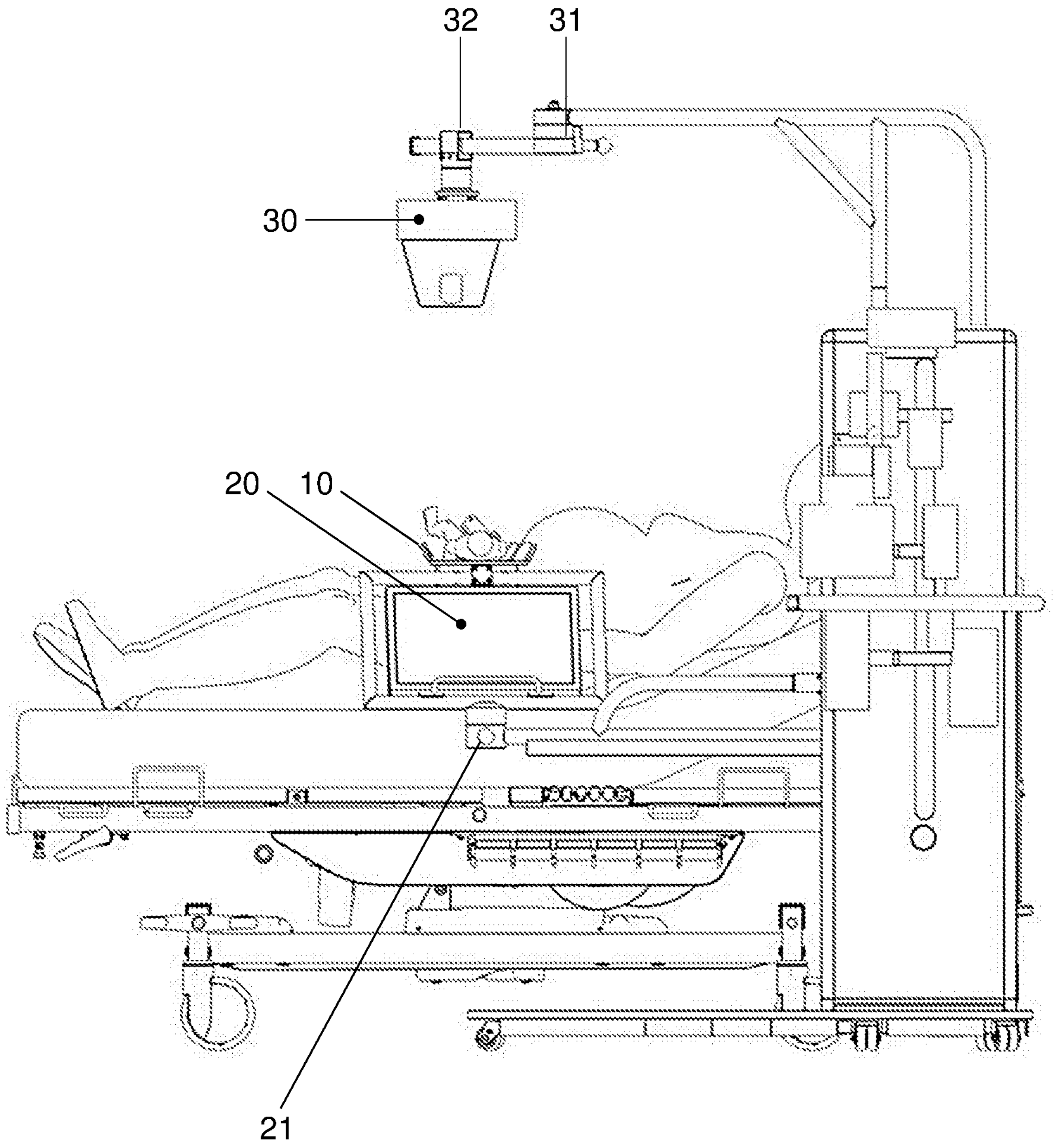
Figure 4D:
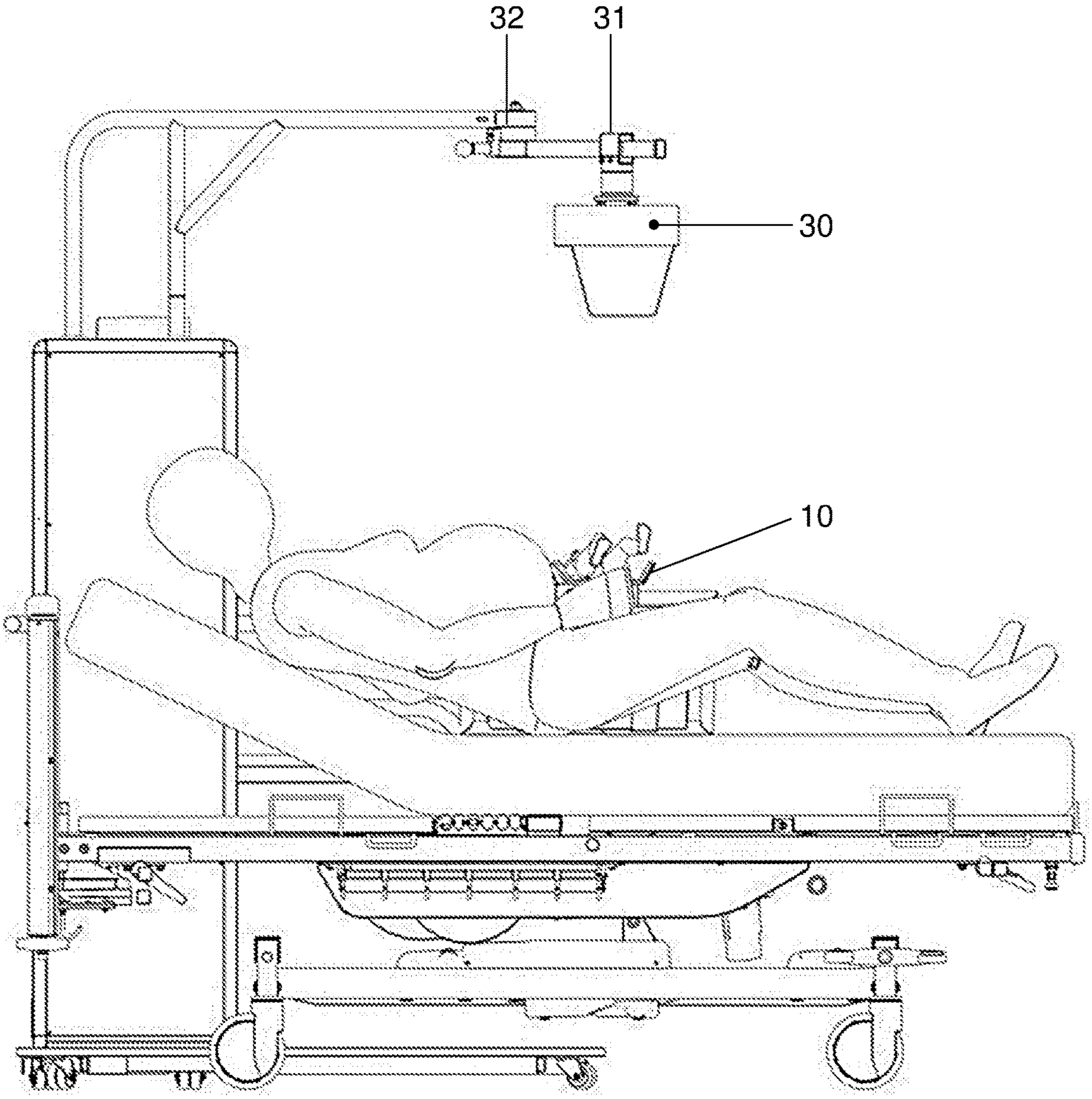
Figure 4E:
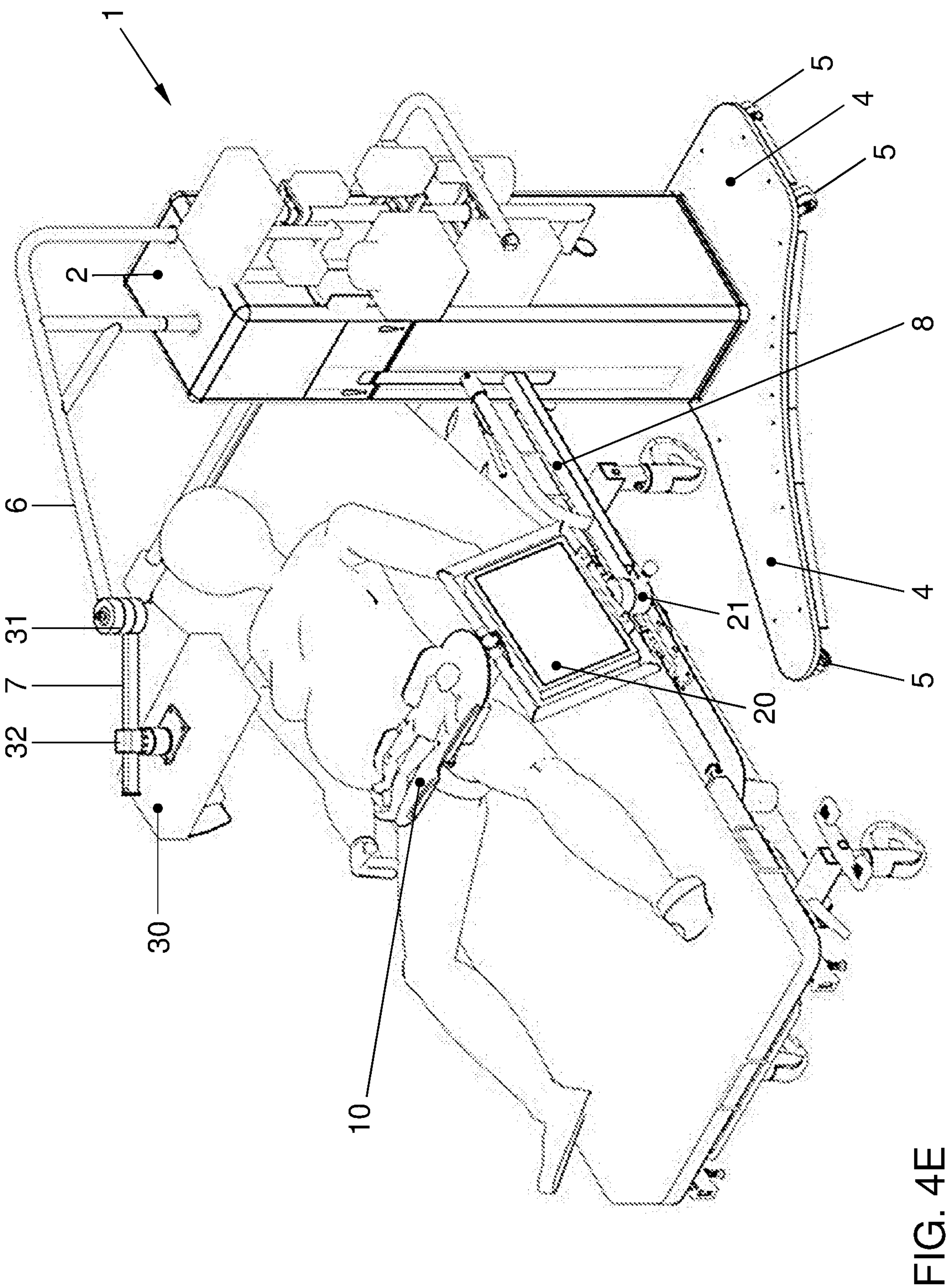
Figure 4F:
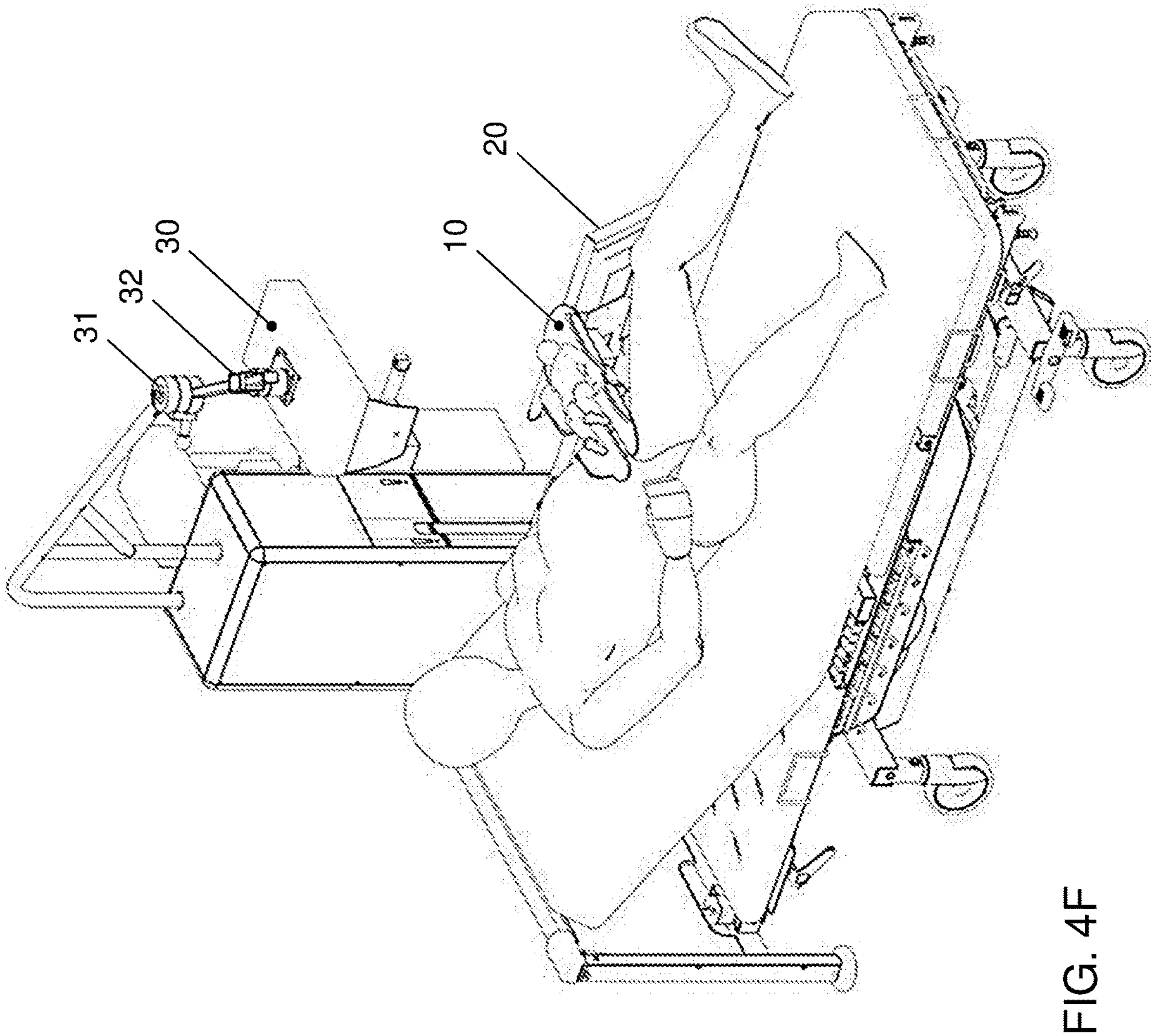

As is illustrated in more detail in FIGS. 3A and 3B, the newborn support device 10 according to the present invention comprises a relatively thin plate-like support platform. The platform has a top surface 11 which is sufficiently large for receiving in an at least almost fully supported manner a newborn thereon. Receiving the newborn in at least almost fully supported manner, i.e. with all body parts being supported, eases the provision of standard care to the newborn and prevents discomfort or injury of the newborn. The platform may comprise or be provided with a relatively soft layer, for instance formed by a mattress, to provide a more comfortable laying surface for the newborn. As the platform is relatively thin, and may be moved with respect to the rest of the resuscitation device, as is described in the foregoing, it is possible to position the platform in close proximity to the mother approximately above the introitus.

In order to allow the newborn to be received on the platform with an intact cord an elongated slit 13 is provided in the platform through which an umbilical cord with which the newborn is attached to the mother can extend. A newborn may be put on the platform such that the legs of the newborn are supported by the parts of the platform on either side of the elongated slit, with the slit thus positioned between the legs of the newborn. The slit extends from an access opening at one side of the platform to a more central region of the top surface 11 approximately up to a crotch of the body of the newborn supported on the platform. When putting a newborn still attached via the umbilical cord on the platform, the umbilical cord can move via the access opening through the length of the slit up to the central region in the platform. Accordingly the umbilical cord extending through the platform does not have to extend around a relatively distant outer edge of the platform, thereby allowing the newborn to be put on the platform with an intact umbilical cord also in cases with relatively short umbilical cord lengths, such as is particularly the case for many preterm newborns.

To prevent a newborn put on the newborn support device 10 from falling of the platform, the support device comprises an edge part 12 extending upward from the top surface 11 at an outer circumference of the platform. The edge part may be sufficiently high to enclose a matrass provided on the platform on the lateral sides and to form a raised rim forming a physical barrier preventing the newborn from rolling over the edge of the platform. On opposite lateral sides of the platform there is no upward edge part, i.e. there is an opening or gap 14 in the edge part, which forms a more convenient lateral access to the top surface 11, for instance to render manual placing and lifting of the newborn to and from the top surface more convenient for the neonatal caregiver.

As is shown in FIGS. 4A-4F in different views of another embodiment of the resuscitation device according to the invention the resuscitation device may be placed adjacent a bed on which a mother of a newborn may be supported with a newborn support device 10 being positioned above the birth canal of the mother. The use of the wording birth canal throughout this document may be understood to mean either the vaginal introitus, i.e. the vaginal opening, or in the event the mother has given birth via a cesarean section, the abdominal opening which is the result of the cesarean section. In both such situations the newborn support device 10 may according to the invention appropriately be positioned above or near the birth canal to support the newborn in close proximity to the mother while allowing for complete delivery of resuscitation support to the newborn with the umbilical cord still intact. The resuscitation device 1 according to this embodiment comprises a vertical stand 2 which at a lower end is provided with a base plate 4 which extends laterally from the vertical stand 2. Below the base plate are provided a couple of rollers, e.g. caster wheels, with which the resuscitation device 1 can be transported over a floor or ground surface.

At the top end of the vertical stand 2 a first arm 6 extends laterally from the stand 2, which first arm 6 at an outer end is coupled via rotation means 31 such as a pivot or hinge to a carrying body 7, e.g. carrying bar, rod or rail, which carries warming means 30. The warming means 30, e.g. a light fixture and heating lamp for providing heat radiation, is axially movable coupled along the carrying body 7, for instance via an eyelet 32 or any other suitable coupling means that allow for movement of the warming means along the carrying body 7. Blocking means or stopping means (not shown) may be provided at a free outer end of the carrying rail 7 to prevent the warming means 30 from falling off the rail. A particular positioning of the warming means on the rail may be adjusted at any time by a user such as a neonatologist/pediatrician, registrar, nurse or other relevant person which is giving support to the newborn by applying a relatively simple pulling or pushing force on the warming means 30, e.g. by hand.

The pivot or hinge 31 between the first arm 6 and carrying body 7 renders a mutual rotation between the first arm 6 and carrying body 7 possible, in order to allow an even more accurate positioning of the warming means 30 above the newborn support device 10 of the resuscitation device 1.

The newborn support device 10 is connected via a monitor 20 and further rotation means 21, e.g. pivot or hinge, to a second arm 8 of the resuscitation device 1 which extends laterally from the stand 2 at a height between the first arm 6 and the base plate 4. The second arm 8 is movable in the vertical height direction along the vertical stand 2 to allow for an adjustment in the height of the second arm carrying the monitor 20 and newborn support device 10.

The further rotation means 21 allows for an adjustment of the monitor 20 with respect to the second arm 8, so that the monitor may be positioned and/or orientated as needed or desired by the neonatal caregiver. In particular the monitor 20 can be positioned in close proximity to the edge of the bed on which the mother of the newborn is supported, allowing the monitor to be in the line of sight of the neonatal caregiver while giving care to the newborn, so that the caregiver may view or observe the data displayed on the monitor without needing to move away from the support platform and the newborn. The further rotation means 21 preferably comprise a pivot or hinge, more preferably a ball pivot, e.g. a ball and socket joint, which allows for free movement of the monitor 20 in multiple directions with respect to the second arm 8. The pivot or hinge 21 may be manually operable for a quick adjustment of the monitor 20 and newborn support device 10 with respect to the other parts of the resuscitation device 1 by the neonatologist/pediatrician, registrar, nurse or other relevant person who is giving support to the newborn. To this end suitable gripping means may be provided for manually controlling the pivot or hinge 21, which gripping means preferably are clearly visible and allow for easy adjustment of the pivot or hinge 21 using relatively little force.

The newborn support device 10 comprises a support platform for carrying a newborn, which support platform can be moved with respect to the monitor 20 in order to allow for an adjustment in horizontal distance between the support platform and the monitor 20. To this end the support platform is guidable or can slide along a guiding track of the newborn support device 10, such as a bar, rod or rail which extends from the monitor 20.

Alternatively, the support platform may be fixedly coupled to a telescopic bar, rod or rail which extends from the monitor 20.

For the purpose of clarity and a concise description, features are described herein as part of the same or separate aspects and preferred embodiments thereof, however, it will be appreciated that the scope of the invention may include embodiments having combinations of all or some of the features described.

The invention claimed is:

1. A newborn support device for supporting a newborn in close proximity to a mother, the newborn support device comprising:

a support platform having a top surface configured to receive and support the newborn thereon, wherein the support platform is provided with an elongated slit that defines a passage in the support platform, the elongated slit being configured to be accessible from a side of the platform and extends through the platform from the top surface to a bottom surface of the platform, the elongated slit being further configured for passing of an umbilical cord with which the newborn is attached to the mother through a part of the platform from the top surface and past the bottom surface, and wherein the support platform is coupled to a support frame, the support frame being configured for positioning of the platform in close proximity to the mother, and wherein the platform is an elongated platform with the slit extending in a longitudinal direction of the platform.

2. The support device according to claim 1, wherein the slit extends in a central region of the top surface from an access opening at the side of the platform.

3. The support device according to claim 2, wherein the slit narrows from the access opening to a part of the slit in the central region of the top surface.

4. The support device according to claim 1, wherein the platform comprises a plate member in which the slit is provided.

5. The support device according to claim 1, wherein the slit extends from the side of the platform along at least one quarter of a length of a longitudinal axis of the platform.

6. The support device according to claim 1, wherein the slit extends from the side of the platform over at least one third of a longitudinal axis of the platform.

7. The support device according to claim 1, wherein the support platform comprises an edge part extending upward from the top surface at an outer circumference.

8. The support device according to claim 1, wherein the support platform enables positioning of the platform aligned above the vaginal introitus of the mother.

9. The support device according to claim 8, wherein the support platform is coupled to the support frame with a pivot that enables pivoting of the platform with respect to the support frame in a horizontal plane.

10. A resuscitation device comprising resuscitation means connected to a newborn support device according to claim 1.

11. The resuscitation device according to claim 10, wherein the resuscitation means comprise a resuscitation monitor for monitoring respiratory functions.

12. The resuscitation device according to claim 11, wherein the resuscitation monitor is coupled to the support device adjacent the support platform.

13. The resuscitation device according to claim 10, wherein the resuscitation device further comprises warming means for directing heat to the support platform.

14. The resuscitation device according to claim 13, wherein the warming means comprise a heat source positioned at a height above the support platform for providing radiation heat to the newborn supported on the support platform.

15. The resuscitation device according to claim 10, wherein the resuscitation device further comprises an undercarriage with rolling means.

* * * * *